United States Patent [19]

Kenney et al.

[11] Patent Number: 6,009,129
[45] Date of Patent: Dec. 28, 1999

[54] DEVICE AND METHOD FOR DETECTION AND REDUCTION OF INTERMODULATION DISTORTION

[75] Inventors: Thomas J. Kenney; Ilkka Niva, both of San Diego; Steven D. Gray, La Jolla; Joe Dowling, San Diego, all of Calif.

[73] Assignee: Nokia Mobile Phones, Finland

[21] Appl. No.: 08/808,601

[22] Filed: Feb. 28, 1997

[51] Int. Cl.⁶ ..................................................... H04B 1/10
[52] U.S. Cl. .......................... 375/346; 375/200; 375/345; 455/234.1; 455/296; 455/63; 370/342
[58] Field of Search ..................................... 375/346, 285, 375/227, 224, 200, 206, 345; 455/234.1, 232.1, 245.1, 250.1, 296, 63, 67.3, 67.1, 226.1; 327/551; 370/342, 335

[56] References Cited

U.S. PATENT DOCUMENTS

| | | | |
|---|---|---|---|
| 4,870,372 | 9/1989 | Suter | 330/280 |
| 5,093,840 | 3/1992 | Schilling | 375/1 |
| 5,222,255 | 6/1993 | Kuo et al. | 455/296 |
| 5,263,048 | 11/1993 | Wade | 375/346 |
| 5,267,262 | 11/1993 | Wheatley, III | 375/1 |
| 5,321,847 | 6/1994 | Johnson, Jr. | 455/63 |
| 5,339,454 | 8/1994 | Kuo et al. | 455/247.1 |
| 5,469,115 | 11/1995 | Peterzell et al. | 330/129 |
| 5,513,386 | 4/1996 | Ogino et al. | 455/234.1 |
| 5,566,201 | 10/1996 | Östman | 375/200 |
| 5,577,022 | 11/1996 | Padovani et al. | 370/13 |
| 5,596,570 | 1/1997 | Soliman | 370/252 |
| 5,612,978 | 3/1997 | Blanchard et al. | 375/346 |
| 5,722,061 | 2/1998 | Hutchinson, IV et al. | 455/234.1 |

FOREIGN PATENT DOCUMENTS

| | | | |
|---|---|---|---|
| 0622907 | 11/1994 | European Pat. Off. | H04B 1/38 |
| 96/19048 | 6/1996 | WIPO | H04B 7/005 |

OTHER PUBLICATIONS

Dong Seung Kwon et al., "CDMA Mobile Station Intermodulation Interference Induced by AMPS Competitor Base Station," Spread Spectrum Techniques and Applications Proceedings, 1996, IEEE 4th Internation Symposium, vol. 1, pp. 380–384, Sep. 1996.

"AMPS Cell Transmitter Interference to CDMA Mobile Receiver", Khalid Hamied and Gerald Labedz, Radio Systems Advanced Technology, May 1996, pp. 1467–1471.

"Reducing IM Distortion in CDMA Cellular Telephones", Dick Bain, *RFdesign*, Dec. 1996, pp. 46–53.

*Primary Examiner*—Stephen Chin
*Assistant Examiner*—Betsy L. Deppe
*Attorney, Agent, or Firm*—Brown, Martin Haller & McClain

[57] ABSTRACT

In the front end of a CDMA cellular or broadband PCS mobile phone receiver, a switched bypass connection is provided to bypass the low noise amplifier, sending the received signal through an amplifier bypass connection. The amplifier bypass connection may include an attenuator. The switched bypass is activated by a control signal generated by a digital signal processor. The digital signal processor analyzes the received signal to detect and determine the relative contribution of the IMD interference to the total received signal power and, when the IMD interference exceeds a predetermined level, sends a control signal to bypass the low noise amplifier. Identification of the presence of IMD interference is by spectral estimation to discern when the mobile phone is in the presence of large near-band signals from an AMPS or other narrow-band base station which causes in-band IMD. In a preferred embodiment, the spectral estimation is performed by collecting a series of data samples from the received signal and, using a digital signal processor (DSP), computing a Discrete Fourier Transform (DFT) to generate frequency domain data, passing the data through a filter bank, then using a decision algorithm to determine whether or not there is sufficient IMD present in the received signal to bypass the LNA. If the IMD level is high enough to warrant bypass of the LNA, the DSP will provide a signal to an automatic gain control (AGC) block for controlling a variable gain amplifier (VGA) to compensate for gain loss due to bypass of the LNA.

40 Claims, 4 Drawing Sheets

DEVICE AND METHOD FOR DETECTION AND REDUCTION OF INTERMODULATION DISTORTION

BACKGROUND OF THE INVENTION

1. Field of the Invention

The present invention relates generally to a method and device for detection of intermodulation distortion (IMD) and reduction of IMD in a code-division-multiple-access (CDMA) mobile telephone system.

2. Description of the Related Art

The rapid growth rate of cellular mobile telephone subscribers, the need to use the cellular phones not only for voice, but also data transmission, and the limited capacity of analog cellular systems, is driving the implementation of digital cellular systems to provide increased capacity and higher quality signals. At some point, a complete transition from analog to digital systems may occur. However, until that time, the two systems must co-exist, and, since there will be no additional spectral allocation for digital cellular, the digital and analog cellular systems must share the same spectrum—869–894 MHZ for receive and 824–849 MHZ for transmit signals.

A digital cellular system using CDMA (code-division-multiple-access) technology has several advantages over other proposed digital technologies, i.e., TDMA and FDMA (time- and frequency-division multiple access, respectively), including ease of frequency planning, increased capacity (at least theoretically) and improved handoffs, among others. CDMA systems have been introduced into high-density markets, i.e., large cities, where analog cellular systems using the AMPS (advanced mobile phone system) are already well established. In these areas, the CDMA base stations are sparsely interspersed amongst a number of existing AMPS base stations. Depending on the distance between the CDMA mobile station (the CDMA cellular subscriber) and the CDMA base stations, and the relative proximity of the AMPS base station, the signal from the AMPS transmitter can generate significant interference which can overload the CDMA phone. This occurs because, when the sensitive amplifier at the receiver front end is driven with the high level of the AMPS signal, it operates in the non-linear region of the amplifier transfer function. In the non-linear operating region, frequency components mix to create new frequency terms in addition to the signals in the received spectrum. This interference, a significant component of which is intermodulation distortion (IMD), occurs when a CDMA phone is physically located far from a CDMA base station, but near an AMPS-only (not co-located) base station. IMD which occurs in this situation has been labeled "mobile-generated IMD".

When mobile-generated IMD (hereinafter, simply "IMD") occurs, two or more signals mix within the receiver due to the non-linearities of the device when operated at overdriven power levels, producing IMD product signals at frequencies that sometimes fall within the receiver passband. If an IMD product within the passband is at a sufficient level relative to the CDMA signal strength, it may interfere with the desired receive signal. Since the CDMA band has a receiver bandwidth that is forty-one times wider than an AMPS band, the probability of an IMD product falling within the CDMA band is relatively high. This creates a mechanism where the narrow band system, including AMPS, NAMPS (Narrow band AMPS), or IS-136-based TDMA, causes a pulse-jamming type of interference over the wide band system, such as IS-95-based DS-CDMA (Direct Sequence CDMA).

Figure 1:
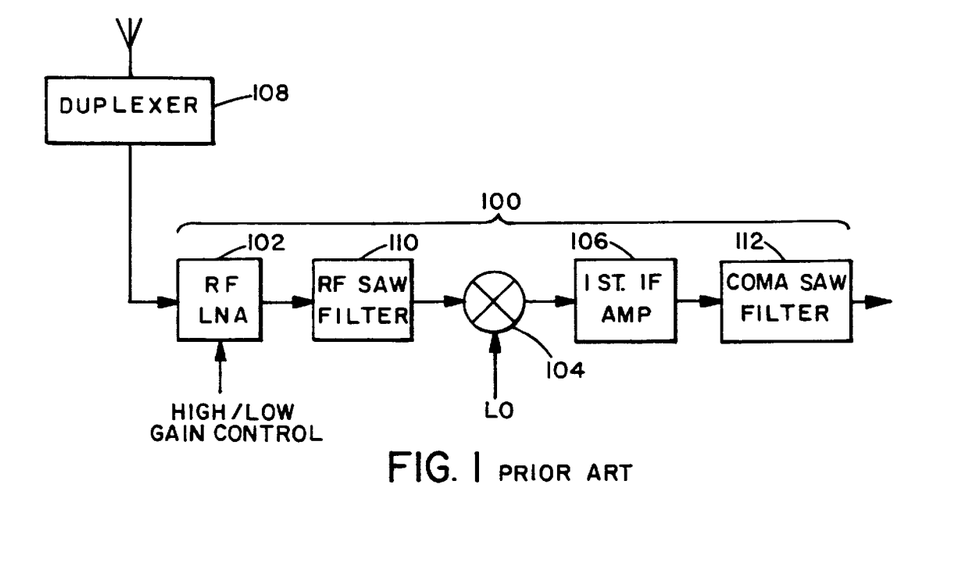
FIG. 1 is a block diagram of a conventional active stage at the front end of a cellular phone receiver.

The IMD generally occurs in the active stages of the mobile phone receiver front end, between the antenna and the channel selectivity filter. FIG. 1, labeled "Prior Art", is a block diagram of a typical active stage for a CDMA phone receiver front end. An active stage 100 typically includes an RF low-noise amplifier ("RF LNA") 102, a mixer 104 (which is coupled to a local oscillator), and an IF amplifier 106, which receive the signal via duplexer 108. The interfering signals pass through the front end RF filter 110 and are not blocked until they reach the channel selectivity IF filter 112. By that point, the IMD products have already been generated and are located within the passband of the DS-CDMA signal.

Figure 2:
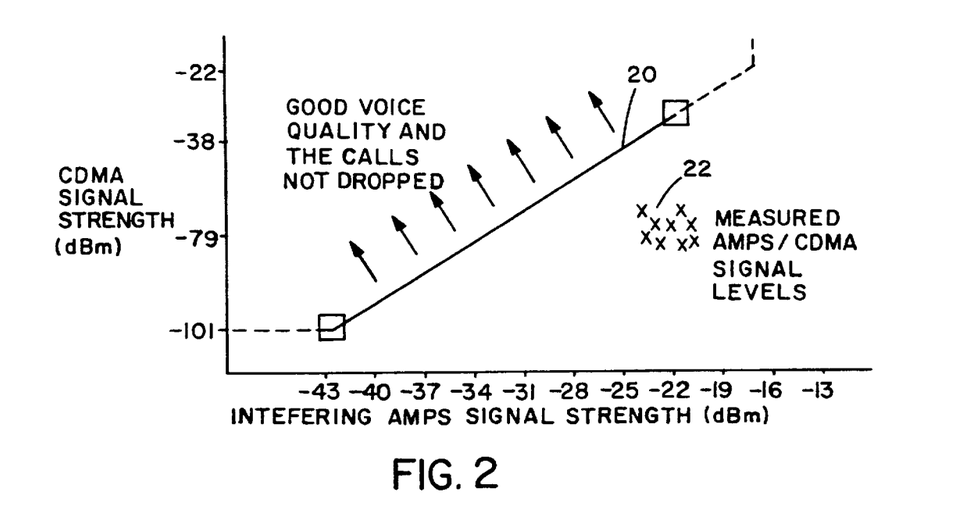
FIG. 2 is a plot of CDMA signal strength versus AMPS signal strength.

The practical intermodulation spurious response attenuation for a standard IS-95 compliant mobile phone is approximately 58 dB. This level of attenuation provides reasonable power consumption at a cost consistent with the requirements of a cellular phone targeted to a mass market. However, field tests conducted on trial CDMA/AMPS dual-mode networks have shown the 58 dB attenuation to be inadequate. FIG. 2 illustrates an exemplary relationship between AMPS signal power levels (along the horizontal axis) and desired CDMA power levels (along the vertical axis), with line 20 indicative of the 58 dB intermodulation interference tolerance margin. The 58 dB line corresponds to a minimum carrier-to-interference ratio (Ci/l) required to maintain acceptable voice quality when the network is highly loaded. The points below the line indicate degraded voice quality and an increased call drop rate, with the Ci/l increasing above the line. Actual field test measurement points are shown in the area designated by reference numeral 22, with all measured points being well below the line, indicating a significant problem for IS-95 based CDMA phones.

One possible solution to providing CDMA service in areas where there are high levels of interference is to co-locate the CDMA cells with the AMPS or other narrow-band cells. This remedy is impractical, particularly for the initial introduction of CDMA into established AMPS territories because a one-to-one match-up of base stations would be very costly. Because there are so many AMPS base stations, the CDMA system will still be vulnerable to system interference due to a near-far effect when the CDMA subscriber is in the vicinity of other noncolocated AMPS sites. Another possible solution is to improve the immunity of the receiver to interference by increasing the dynamic range capability of the LNA, specifically increasing the maximum power handling capability. However, this solution is also impractical because it requires increasing the supply current to the receiver and defeats one of the significant advantages of CDMA—that of increased battery life and greater talk and stand-by time in the cellular phone. Since these solutions cannot remedy the interference problem without substantial compromise, efforts have been directed to minimizing the IMD interference.

IMD may be defined in terms of the peak spurious level generated by two or more tones injected into a receiver. A solution to minimize the effects of IMD is to attenuate strong IMD ($IIP_3$ (third-order intercept point)) signals at the mobile station's front end, i.e., between the antenna and the active elements. The third order intercept point is typically defined for a receiver as the input power (in the form of two tones) required to create third order distortion products equal to the input two tone power. The higher the $IIP_3$, the lower the level of IMD products generated for a given level of input tones. Because the low noise amplifier (LNA) has a low $IIP_3$, and because it is needed for providing the target noise figure when receiving the weak desired signal, it is logical choice for the point of selective, i.e., switched, bypass and/or attenuation. The LNA is a wide bandwidth step amplifier with a step size that may typically vary between 15 and 22 dB, depending on the design partition, although it can cover a range anywhere from 0 dB on up.

Different methods have been proposed to reduce the level of IMD products, including that described by Bain in his article entitled "Reducing IM distortion in CDMA cellular telephones", published in *RF Design*, Dec. 1996, pp. 46–53, which is incorporated herein by reference. Bain describes a method for determining the RF input level for a given signal and switching in an attenuator prior to the LNA if that level exceeds a predetermined threshold. The LNA is not bypassed, but remains active within the receiver front end. The attenuator can be fixed or variable. Since the threshold and detection are both based upon the total received signal level without regard to the AMPS signal level, signal-to-noise ratio (SNR) is sacrificed, and the risk of a call being dropped is high if the AMPS signal level is much larger than the CDMA signal level. In this situation, the combined signal is high enough to switch in the attenuator, but the relatively weak CDMA signal is of such a low level that, without amplification, it cannot be detected, resulting in a loss of the call.

Another method is described in the international patent application of Wheatley, et al. (International Publication No. WO 96/19048; International Application No. PCT/95US/16002, entitled "Method and Apparatus for Increasing Receiver Immunity to Interference"), which is incorporated herein by reference. This method uses a pair of switches for coupling the received signal to either an amplifier input in the first switch position or directly to a bandpass filter, bypassing the amplifier, in the second switch position. A microcontroller monitors the power of the received signal, switching between the first and second positions in response to the total received signal power exceeding a predetermined threshold. An alternate embodiment continuously adjusts the front end gain based upon another predetermined power threshold and information from an included received signal strength indicator (RSSI). As in the method proposed by Bain, the activation of the attenuation is based upon the total received signal level, without reference to the relative contribution of the undesired AMPS signal (or other source of interference). Therefore, the risk remains that low level CDMA signals will be dropped because the attenuator setting is too high or the received signal amplification is too low.

Figure 8:
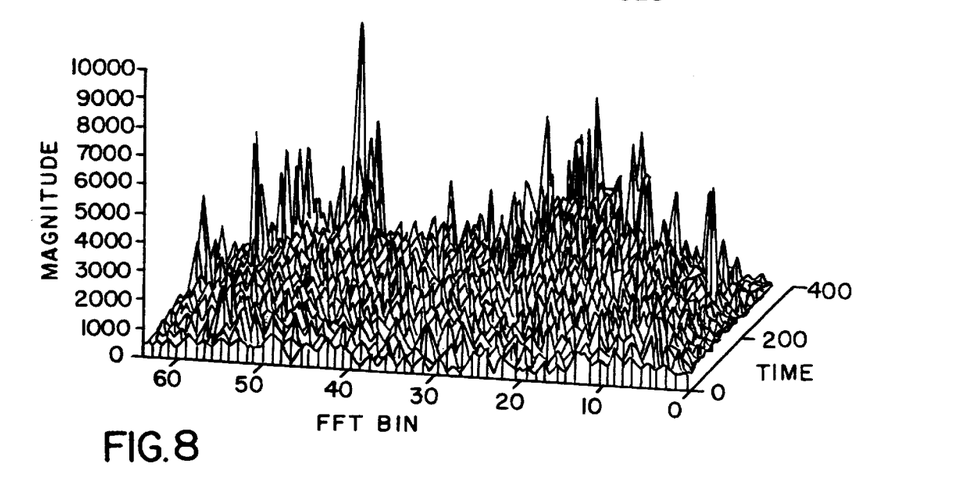
FIG. 8 is a plot of the output of a fast Fourier transform (FFT) showing IMD within the CDMA frequency band.

Efforts toward providing more specific reaction to IM interference to avoid unnecessary activation of an amplifier bypass are hindered by the fact that IM interference is a random process, making detection of the interference in a mobile channel environment a difficult task. FIG. 8 provides an example of the presence of IMD across the CDMA bandwidth as determined from the output of an FFT processor. This plot, which was generated using field measurements conducted while traveling in the direction of an AMPS base station, illustrates how the interference appears in small bandwidths within the total bandwidth, and how it is randomly spread across the bandwidth. When the entire bandwidth is used to detect IMD power level, the effect of the narrow-band interference cannot be properly taken into account.

Similar interference from IMD may be experienced in broadband PCS 1900 (personal communications services) wireless phones due to the use of low noise amplifiers in the receiver front end and the required simultaneous reception of all cellular channels. The PCS band is at 1930–1990 MHZ for receive and 1850–1910 MHZ for transmit signals, therefore, there is no overlap of AMPS signals within the same input spectrum. However, since IMD is a product of mixing of two or more input signals within the low noise amplifier, a high level relatively narrow-band signal from a nearby AMPS base station or other source could, nonetheless, result in IM products within a PCS 1900 mobile phone, resulting in degraded signals and dropped calls.

For the foregoing reasons, in order to effectively integrate CDMA- and other broadband-based mobile phone systems into AMPS service areas, the need remains for a method and system for detecting AMPS-induced IMD interference for selective activation of an IMD product-reducing operation which minimize the incidence of broadband-based calls that are dropped due to over-compensation or lack of sensitivity in the IMD filtering mechanism. A successful method for determining whether IMD interference is present requires consideration of the exact nature of the interference. The prior art solutions have failed to make such a consideration.

SUMMARY OF THE INVENTION

It is an advantage of the present invention to provide a method and device for detecting intermodulation distortion in a CDMA- or other broadband-based system which permit identification of components of the IMD interference introduced by narrow-band signals falling within the broadband spectrum, such as signals from AMPS-based systems.

It is another advantage of the present invention to provide a method and apparatus for controlling a filtering function for reduction of the IMD interference when narrow-band-caused intermodulation products are detected within the CDMA or other broadband.

In an exemplary embodiment, in the front end of a broadband mobile cellular phone receiver, a switched bypass connection is provided to bypass the low noise amplifier, passing the received signal to a point on the output side of the low noise amplifier. An attenuator may be included within the bypass connection. The switched bypass is activated by a control signal generated by a digital signal processor. The digital signal processor analyzes the received signal to detect and determine the relative contribution of the IMD interference to the total received signal power (RSSI) and, when the IMD interference exceeds a predetermined level, sends a control signal to bypass the low noise amplifier.

Identification of the presence of IMD interference is achieved by performing a spectral estimation to discern when an IS-95 CDMA cellular phone or PCS 1900 mobile phone is in the presence of large near-band signals which cause in-band IMD. In an exemplary embodiment, the spectral estimation is performed by collecting a series of data samples from the received signal at the analog-to-digital (A/D) converters, after it has passed through active stage(s) of the receiver front end. Using the collected samples, a digital signal processor (DSP) computes a Discrete Fourier Transform (DFT) to generate a plurality of bins of data. A magnitude value is then calculated for each bin. An average magnitude is calculated for each bin for the collected samples by passing the data through a filter bank with one filter for each bin in the frequency domain, then operated on by a decision algorithm which determines whether or not there is sufficient IMD present in the received signal to bypass the LNA. If the IMD level is high enough to warrant bypass of the LNA, the DSP will provide a signal to an automatic gain control (AGC) block for controlling a variable gain amplifier (VGA) to compensate for gain loss due to bypass of the LNA.

The data collection occurs during a short duration interrupt routine, the period of which is determined based upon a balancing between hardware complexity, battery life, and detection robustness, i.e., detector reliability. In the preferred embodiment, the detector is updated at the beginning of every frame which, according to the IS-95 standard, is 20 milliseconds. The interrupt is of short duration, on the order of 1 msec or less, consuming a small amount of total processing resources, and, therefore, is transparent to the end user.

Since the determination of the presence of in-band IMD is based upon spectral estimation, other statistical methods may be used to, including autocorrelation, windowed FFT, Burg method, and other parametric methods.

While described as a method for filtering IMD generated within the mobile cellular phone, the inventive method may also be used to filter non-mobile station-generated IMD interference which may be received by a CDMA or other broadband mobile phone, such as narrow band co-channel interference and base station transmitter-generated IMD. Generally, the inventive method and device provides means for adapting a mobile cellular phone to cell traffic loading without sacrificing the cellular phone's noise floor in area where IMD is not a factor, and without adding power consumption or increasing cost.

BRIEF DESCRIPTION OF THE DRAWINGS

Understanding the present invention will be facilitated by consideration of the following detailed description of a preferred embodiment of the present invention taken in conjunction with the accompanying drawings, in which like numeral refer to like parts and in which.

DETAILED DESCRIPTION OF THE PREFERRED EMBODIMENT

The following detailed description of the preferred embodiment describes application of the inventive method and device to a CDMA mobile phone. It should be noted that because intermodulation distortion produces interference in many RF systems, and is a significant problem in mobile phones, the methods described herein are similarly applicable to other broadband-based mobile phones, including PCD 1900 mobile phones.

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
| --- | --- |
| A/D | Analog to Digital (converter) |
| AGC | Automatic Gain Control |
| AMPS | Advanced Mobile Phone System |
| ASIC | Application Specific Integrated Circuit |
| BPF | Band Pass Filter |
| CDMA | Code Division Multiple Access |
| Ci/I | Carrier to Interference Ratio |
| DFT | Discrete Fourier Transform |
| DS | Direct Sequence |
| FDMA | Frequency Division Multiple Access |
| FFT | Fast Fourier Transform |
| IF | Intermediate Frequency |
| $IIP_3$ | Third Order Intercept Point |
| IIR | Infinite Impulse Response |
| IM | Intermodulation |
| IMD | Intermodulation Distortion |
| INR | Interference to Noise Ratio |
| IS | Interim Standard |
| LNA | Low Noise Amplifier |
| LO | Local Oscillator |
| LPC | Linear Predictive Coding |
| LPF | Low Pass Filter |
| MS | Mobile Station |
| PCS | Personal Communications Services |
| PSF | Point Spread Function |
| RF | Radio Frequency |
| RSSI | Received Signal Strength |
| RX | Receive |
| SAW | Surface Acoustic Wave |
| SNR | Signal to Noise Ratio |
| TDMA | Time Division Multiple Access |

Figure 3:
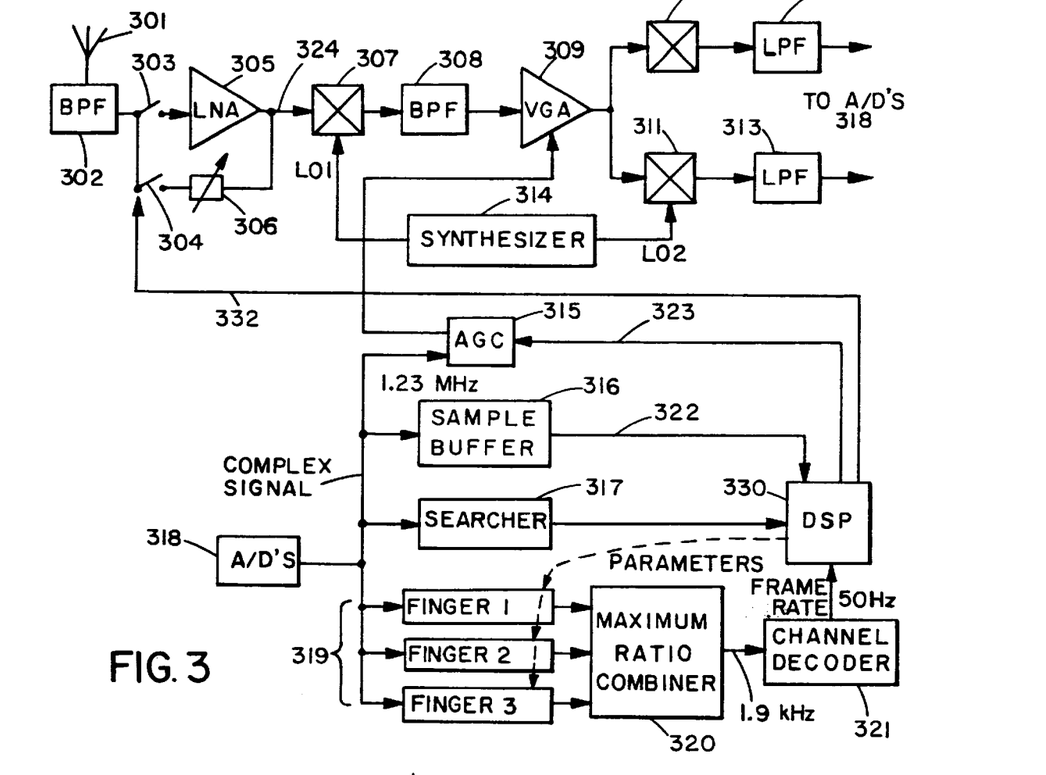
FIG. 3 is a block diagram of the front end of a cellular phone receiver according to the present invention along with other receiver functions.

A block diagram of the architecture of the preferred embodiment for implementation of the detection and filtering method of the present invention is provided in FIG. 3. A transmitted signal is received at antenna 301 and passed through broad-band bandpass filter 302, which passes only receive channels from 869 to 894 MHZ to be considered for demodulation by the receiver (1930 to 1990 MHz for PCS 1900.) If closed, switch 303 couples the broad band-filtered signal to low noise amplifier (LNA) 305 and out to node 324. If open, switch 303 couples the broad band-filtered signal to switch 304, which, if closed, passes the signal through attenuator 306, then on to node 324. During initial start-up of the receiver, LNA 305 is set to high gain to facilitate signal location, where it remains until the IMD detection function is executed and provides a signal to indicate the presence of IMD.

From node 324, the signal, which has either been attenuated, amplified, or unchanged (if no attenuator is provided), depending on its route, is coupled to mixer/local oscillator (LO) 307 which down-converts the received signal to a first intermediate frequency (IF) signal. The first IF signal is filtered through bandpass filter 308 and amplified by variable gain amplifier (VGA) 309 according to the control signal provided by automatic gain controller (AGC) 315. From the output of VGA 309, the first IF signal is split and converted to a second IF signal at mixer/LOs 310,311 which is coupled through low pass filters (LPF) 312,313 to analog-to-digital converters (A/D) 318. LPFs 312,313 are preferably CDMA SAW filters, as are known in the art (see, e.g., FIG. 1). Frequency synthesizer 314, which typically includes a crystal oscillator for frequency reference and a phase detector, generates a control voltage signal to adjust the frequency of LOs coupled to mixers 307,310 and 311.

The digital output from A/Ds 318 is coupled to automatic gain control (AGC) block 315, PN searcher 317, and Rake demodulator 319 which has three parallel fingers, each of which includes a local PN generator. The one-sided bandwidth of the CDMA signal is 0.6144 MHZ, so the digital signal from A/Ds 318 is sampled at the minimum data rate of 1.2288 MHZ to satisfy sampling theory requirements.

The outputs from the fingers of Rake demodulator 319 are summed at maximum ratio combiner 320 and passed to channel decoder block 321. From channel decoder block 321, the data is passed to the digital signal processor (DSP) 330 at a frame rate of 50 Hz. For ease of implementation and overall size reduction of the mobile phone, AGC block 315, sample buffer 316, searcher block 317, Rake demodulator 319, combiner 320 and channel decoder 321, and the connections (e.g., 322,323) between various elements are preferably integrated onto an ASIC (application specific integrated circuit).

Acquisition of the I (in-phase) and Q (quadrature) signals from the received signal (RX) is performed in searcher block 317 by a phase demodulator integrated therein (not illustrated). The searcher block also includes a RAM, shown separately as sample buffer 316, within which the I and Q samples are stored. Sample buffer 316 consists of 64×9 bit words, where the lower 4 bits (0,1,2,3) of each word correspond to the Q sample and the next 4 bits (4,5,6,7) correspond to the I sample. The MSB (most significant bit), bit 8, should be set to zero during RX IQ acquisition mode. The selection of 64 complex data samples is based upon a balancing of the need for a sufficiently large sample to obtain resolution against a sufficiently small sample size for short computing time. From the 64 data samples, a 64 point DFT is computed, producing 64 frequency bins with a 19.2 kHz spacing. Since the AMPS signal bandwidth is 30 kHz, this degree of resolution provides ample coverage. It will be apparent that smaller or larger sample sizes may be selected to achieve acceptable results, although it should be noted that some degradation of performance may occur. For example, if a 32 point FFT were to be used, the bin spacing would be 38.4 kHz, posing a risk of missing an AMPS signal that falls within a single bin spacing. The searcher block 317 also includes an RSSI detector (not illustrated) which measures and provides a signal to DSP 330 indicative of received signal power.

During acquisition of the RX IQ, the searcher block's searching function is briefly interrupted, on the order of 1 millisecond or less. The I and Q samples stored in sample buffer 316, which, although illustrated separately, is part of searcher block 317, are transferred to DSP 330 where a 64 point complex Fast Fourier Transform (FFT) is run every 20 milliseconds. This repetition rate is based upon the frame rate according to the IS-95 standard, however, other repetition rates may be used.

AGC block 315 receives a control signal from DSP 330 by way of connection 323 for setting the gain of VGA 309. (It should be noted that the implementation of this connection is by the DSP 330 writing to a register which then passes the signal on to the AGC block, as is known in the art. For simplicity, the functional connection has been designated by reference numeral 323.) This control signal is provided in response to the DSP's determination that IMD is present so that the AGC block 315 can compensate for the loss of gain when the LNA 305 is bypassed. Because the DSP 330 determines the noise estimate and the RSSI as well as the level of IMD, the AGC block 315 sets the gain of VGA 309 to a level appropriate for the received signal.

The method of detecting IMD within an RX signal makes the assumption that two distinct cases occur. The first case is that only the CDMA signal is present within the desired frequency band (869–894 MHZ). The second assumes that both the CDMA signal and the IM interference is present within the desired spectrum. According to the preferred embodiment of the present invention, the test for detecting IMD is to (1) collect FFT outputs of the DSP processor within the phone; (2) form a test statistic; and (3) compare the statistic to a threshold. After each test, the outcome is a decision that IMD is either present or not.

Figure 4:
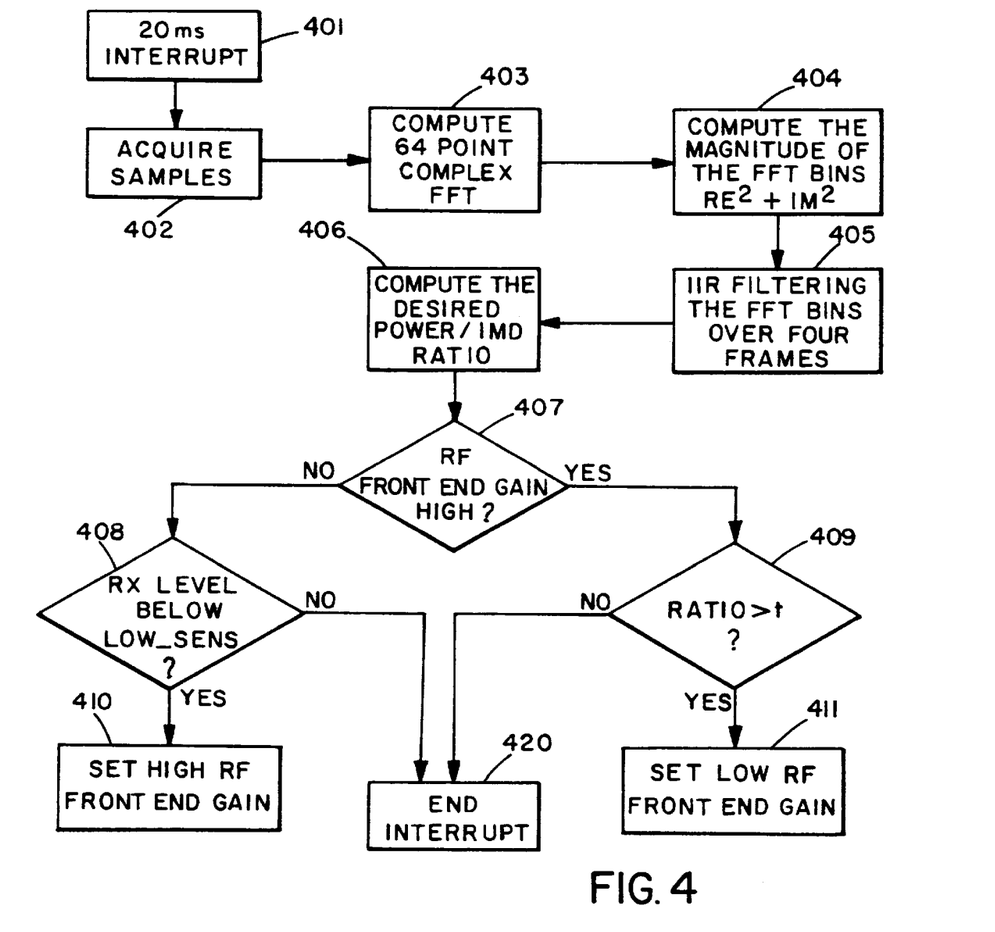
FIG. 4 is a flow diagram showing the process for detection of IMD.

Referring now to FIG. 4, beginning with the transfer of the received, downconverted signal from the A/Ds 318 to the searcher block 317, a 20 msec interrupt occurs beginning at step 401 and ending at step 420, during which the RX IQ samples are acquired, stored in sample buffer 316 (step 402) and operated upon to test for the presence of IMD (steps 403–406).

After transfer of the samples to DSP 330, the FFT transforms the received time domain signal into the frequency domain to provide N discrete samples within the frequency spectrum (step 403). In the case of the preferred embodiment, N=64. Each of the N bins has a magnitude which is computed (step 404) and processed through a corresponding one of N digital filters (step 405), in this case, an infinite impulse response (IIR) filter, which is known in the art. (See, e.g., Marven and Ewers, *A Simple Approach to Digital Signal Processing,* 1996, Wiley Interscience, New York). The resulting values are stored within memory in DSP 330 while data from another frame is collected. When the FFT computation and filtering steps (404, 405) have been completed for four frames, the average magnitude for each individual bin is calculated. The result is the average power for each DFT bin.

Of the N bins, M maximums are identified as having the highest average powers. Excluding the bins with the M maximums, the average power for the remaining (N−M) bins across the entire sample bandwidth is calculated. This value represents the "noise estimate."

Figure 5:
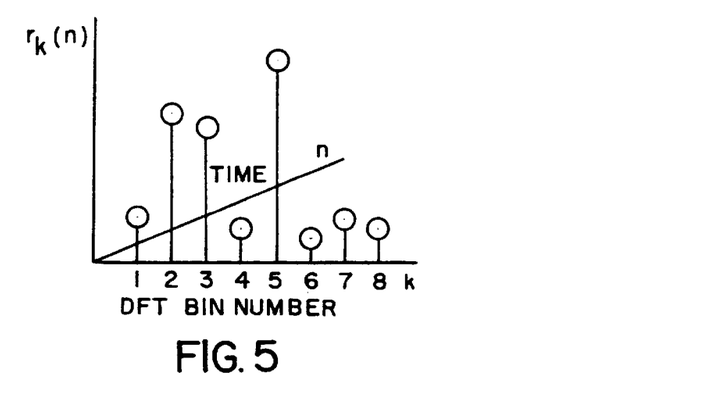
FIG. 5 is a plot of frequency versus magnitude showing a hypothetical example of a DFT of a sample signal when IMD is present.

FIG. 5 provides a hypothetical example of a record produced by the FFT processor. Here, DFT bin numbers 1 through 8 are shown, each having a distinct magnitude $r_k$. Setting M at three, bins 2, 3 and 5 have the maximum values, leaving bins 1, 4, and 6–8 for calculating the noise estimate.

Because the number of interfering signals and their respective frequencies are not known a priori, the value for M is preferably selected using field measurements since it is a function of a particular network's configuration. The value of M should be low enough that it does not detract from the noise estimate, but high enough that interfering signals do not bias the noise estimate. The selection of the value for M will also vary with the front end architecture of the mobile phone, depending on the RF receive chain.

The average power for the M maximum bins is calculated to provide the average interfering signal, i.e., the "interference estimate", and the interference to noise ratio (INR) is computed in step 406. Referring briefly to FIG. 5, the average interfering signal magnitude will be determined from the average of bins 2, 3 and 5.

In step 407, the DSP 320 checks to determine if the present gain setting of LNA 305 is high or low. During initial power-up, the LNA gain is set to "high" to facilitate reliable location of the desired signal. If, following the current sample collection and processing sequence (steps 401–406), the gain is set to high, either because this is the first test after start-up or because IMD was not previously present, the INR is compared to a pre-determined threshold in step 409. The threshold is dependent upon the network's configuration and may be most readily determined by field testing. One possible method for establishing the threshold is to set the threshold t equal to the expected value of INR when IMD is known to be present.

If the INR exceeds the threshold, the method proceeds to step 411 where the front end gain is set low by sending a command to bypass LNA 305, diverting the received signal through attenuator 306. If the LNA gain is low, or if the INR is less than the threshold, the received signal is evaluated to determine whether its signal strength (RSSI) is so low as to be undetectable without high gain at LNA 305 (step 408). If the RSSI is low, the bypass is switched off and the gain of LNA 305 is set high (step 410). If, in step 409, the INR is less than the threshold or, in step 408, the received signal is not so low at to be undetectable, the sampling interrupt is ended (step 420).

Switching LNA 305 out of the receiver chain results in less overall gain and a third order decrease in the power of IM products. However, eliminating the LNA from the receiver chain also increases the noise floor, which can have a detrimental effect on the performance at low signal-to-noise ratios. Therefore, a balancing must occur in which not all IM products can be responded to by bypassing the LNA, but only those at such a level that substantial degradation of a CDMA call occurs.

The algorithm used in the preferred embodiment for estimation of the presence of IMD includes the following steps:

1) Compute the DFT using complex values input data utilizing the FFT algorithm:

$$X_l(k) = \sum_{n=0}^{N-1} x_l(n) e^{-j2\pi kn/N} \quad k = 0, 1, \ldots, N-1 \quad (1)$$

$$l = 1, 2, \ldots, L$$

where:

N is the FFT length (for reasons previously described, N=64); and $x_l(n)$ is the complex input data from the A/Ds sampled at a rate of 1.2288 MHZ for the $n^{th}$ sample of the $l^{th}$ frame.

2) Compute energy frequency domain samples:

$$Z_l(k) = |X_l(k)|^2 \quad (2)$$

3) Pass output to N independent IIR filter banks:

$$R_{l+1}(k) = c_1 R_l(k) + (1-c_1) Z_l(k), \quad (3)$$

where:

$R_{l+1}(k)$ is the output of the kth DFT bin at time I+1; and $c_1$ is the IIR filter coefficient.

4) Order the N DFT bins, $R_l(k)$, from smallest, $R_l^1$, to largest, $R_l^{P+M}$:

$$\{R_l^1, R_l^2, \ldots, R_l^P, R_l^{P+1}, \ldots, R_l^{P+M}\}, \quad (4)$$

where N=P+M.

$$R_{max} = \{R_l^{P+1}, R_l^{P+2}, \ldots, R_l^{P+M}\}, \quad (5)$$

and $$R_{min} = \{R_l^1, R_l^2, \ldots, R_l^P\}. \quad (6)$$

5) Define the IMD estimate over $R_{max}$ as:

$$\hat{S}_l = \frac{1}{M} \sum_{p=P+1}^{P+M} R_l^p(k) \quad (7)$$

6) Define the background noise estimate over $R_{min}$ as:

$$\hat{N}_l = \frac{1}{P} \sum_{p=1}^{P} R_l^p(k) \quad (8)$$

7) Compute an interference to background signal power ratio (INR) and compare to a pre-determined threshold:

$$\frac{\hat{S}_l}{\hat{N}_l} \overset{H_1}{\underset{H_2}{\gtrless}} t \quad (9)$$

where:

t is a threshold;

$H_1$ is the hypothesis which is true when interfering signals are present; and $H_2$ is true when no interfering signal are present.

As previously stated, the threshold t is generally set to satisfy the performance criteria of a particular network, with possible consideration being given to the relative densities of and distances between AMPS and CDMA base stations. One possible means for determining the threshold being to set the threshold t equal to the expected SNR when IMD is present.

Since the interfering signal may not be confined within one frequency bin, and the energy would, therefore, be present in adjacent bins, the noise estimate could be biased. An approach to reduce this bias is to use window functions which are other than rectangular, thus increasing the computational complexity. Another possible approach is to discard bins adjacent to the M maximum bins. While this latter method may have some effect on the noise estimate since fewer samples will be available for use in the estimate, such a compromise may be justified due to its effectiveness in eliminating the IMD signal leakage.

Figure 6:
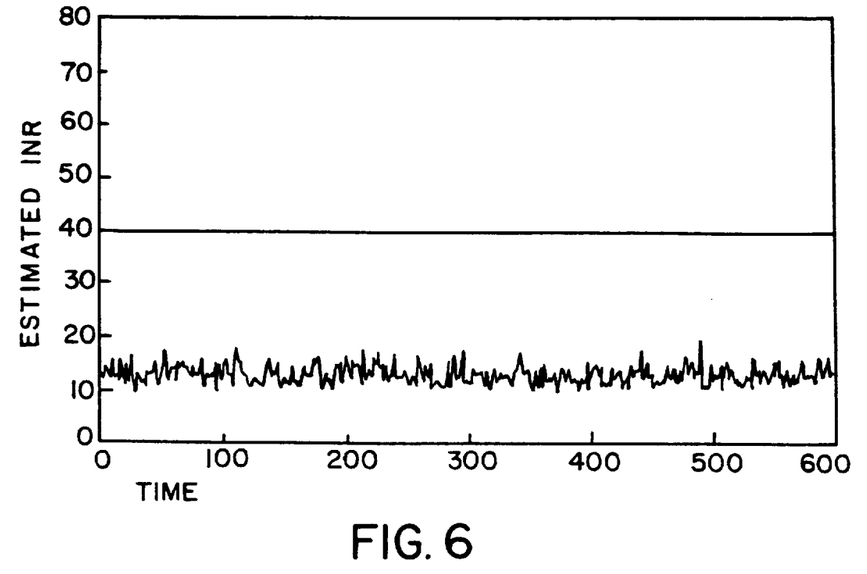
FIG. 6 is a plot of the computed interference-to-noise ratio with time, using field data, when IMD is absent.
Figure 7:
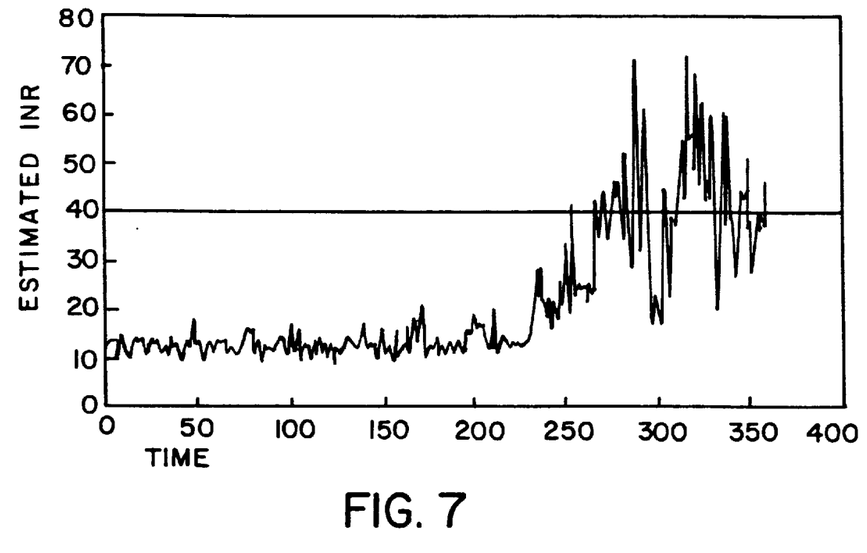
FIG. 7 is a plot of computed interference-to-noise ratio with time, using field data, when IMD is present.

FIGS. 6 and 7 represent the output of the INR computation step (step 406 in FIG. 4) when IMD is not, and when IMD is present, respectively. These plots were generated using field measurements gathered using a prototype CDMA mobile cellular phone. The test phone has an expected test statistic (INR) of 10 dB when no IMD is present, as shown in FIG. 6. With a threshold of 40 dB, the INR is clearly well below the threshold, with no apparent risk of false triggering of the bypass switch.

When the test phone traveled toward a known IMD area, the test statistic (INR) increased as the AMPS base station was approached, as shown in FIG. 7, indicating a substantial presence of IMD. Again comparing to the threshold of 40 dB as indicated on the plot, some, but not all, of the IMD would trigger a switched bypass of the LNA in a compromise which would minimize false triggering.

Because the above-described method uses spectral estimation to determine whether IMD is present or not, it will be apparent to those skilled in the art that other statistical methods may be used in a similar manner to estimate the spectrum. Among other methods which may be used are autocorrelation, windowed FFT, Burg method and parametric methods, including algorithms used in linear predictive coding (LPC). (See, e.g., Therrein, C. W., *Discrete Random Signals and Statistical Signal Processing,* Prentice-Hall, Ingelwood Cliffs, N.J.; Marven and Ewers, supra.) LPC methods may be particularly suited for the use in a mobile phone since the algorithms are already employed in the vocoder, allowing reuse of the appropriate algorithm(s) and the DSP's processing capability with little or no additional hardware or software. In general, the device for implementation of the method of detection of IMD can be implemented with hardware components, many of which are already present within the mobile phone's architecture, allowing implementation to be attained at minimal cost, even if multi-purpose algorithms such as LPC are not used for the vocoder and the IMD detection functions.

The inventive method and device for detecting and filtering IMD is particularly effective for CDMA due to the fact that the CDMA spectrum is generally flat. The ability to identify IMD within the CDMA band permits the introduction of selective filtering based upon the actual presence of IMD as opposed to reliance solely upon total received signal power as used in prior art methods, thus making the inventive method and device well suited for addressing the problems of introducing CDMA cellular networks within established AMPS or similar service areas. Application of the inventive method and technique is also beneficial for other broadband mobile phone systems, including PCS 1900 mobile phones.

It will be apparent to those skilled in the art that various modifications and variation can be made in the system of the present invention without departing from the spirit or scope of the invention. Thus, it is intended that the present invention cover the modification and variations of this invention provided they come within the scope of the appended claims and their equivalence.

We claim:

1. A device for detecting and reducing in-band intermodulation distortion in a broadband-based mobile phone comprising:

a receiver for receiving a signal within a broadband spectrum, the receiver having a low noise amplifier, switchable means for bypassing the low noise amplifier in response to a bypass command, and a converter for converting the received signal into a digital signal;

a digital signal processor for receiving the digital signal, extracting a plurality of samples therefrom at a pre-determined sampling interval, performing a spectral estimation for each of the plurality of samples, the spectral estimation comprising a plurality of frequency values, each frequency value having a magnitude within a range of magnitudes, identifying within the range of magnitudes a first group of magnitudes and a second group of magnitudes, the first group comprising a pre-determined number of magnitudes at a high end of the range of magnitudes, computing a first averaged magnitude for the first group of magnitudes to determine an interference estimate, computing a second averaged magnitude for a second group to determine a noise estimate for the received signal, calculating an interference statistic from the first averaged magnitude and the second averaged magnitude, comparing the interference statistic to a pre-determined threshold and, if the interference statistic exceeds the pre-determined threshold, providing the bypass command to the switchable means to bypass the low noise amplifier.

2. A device as in claim 1, wherein the spectral estimation is performed within the digital signal processor using a discrete Fourier transform.

3. A device as in claim 2, wherein the plurality of frequency values comprises N bins of the discrete Fourier transform and the digital signal processor further calculates an average bin magnitude for each bin from the plurality of samples to provide N average bin magnitudes, wherein the first averaged magnitude and the second averaged magnitude are calculated from the N average bin magnitudes.

4. A device as in claim 3, wherein each of the plurality of samples is filtered by a bank of N filters with one filter corresponding to each bin.

5. A device as in claim 2, wherein the digital signal processor computes the discrete Fourier transform using a fast Fourier transform.

6. A device as in claim 1, wherein the interference statistic comprises a ratio of the first averaged magnitude and the second averaged magnitude.

7. A device as in claim 1, wherein the pre-determined threshold is set to equal the interference statistic when in-band intermodulation noise is known to be present.

8. A device as in claim 1, further comprising a variable gain amplifier and a gain control block responsive to the gain control signal, wherein the gain control block increases a gain of the variable gain amplifier when the digital signal processor generates a gain control signal in conjunction with the bypass command.

9. A device as in claim 1, further comprising an attenuator connected to the switchable means for attenuating the received signal when the low noise amplifier is bypassed.

10. A method for detecting an in-band interfering signal within a broad bandwidth receive signal comprising:

receiving an analog receive signal;

converting the analog receive signal to a digital signal;

extracting a plurality of samples from the digital signal at a predetermined sampling interval;

performing a spectral estimation for each of the plurality of samples, the spectral estimation comprising a plurality of frequency values, each frequency value having a magnitude within a range of magnitudes;

identifying within the range of magnitudes a first group of magnitudes representative of frequency values of the plurality values having high level in-band interfering signals;

comparing the first group of magnitudes against a second group of magnitudes within the range of magnitudes to determine an interference statistic;

comparing the interference statistic to a pre-determined threshold indicative of in-band intermodulation distortion.

11. The method of claim 10, wherein the step of performing a spectral estimation comprises calculating a discrete Fourier transform.

12. The method of claim 11, wherein the plurality of frequency values comprises N bins of the discrete Fourier transform and the performing a spectral estimation further includes calculating an average bin magnitude for each bin from the plurality of samples to provide N average bin magnitudes, wherein the first group of magnitudes and the second group of magnitudes are taken from the N average bin magnitudes.

13. The method of claim 12, wherein the step of spectral estimation further includes filtering each of the plurality of samples through a bank of N filters with one filter corresponding to each bin.

14. The method of claim 13, wherein the step of filtering comprises using infinite impulse response filtering.

15. The method of claim 11, wherein the step of calculating a discrete Fourier transform includes a fast Fourier transform.

16. The method of claim 11, wherein the discrete Fourier transform has 64 points.

17. The method of claim 10, wherein the interference statistic comprises a ratio of a first averaged magnitude of the first group of magnitudes and a second averaged magnitude of the second group of magnitudes.

18. The method of claim 12, wherein the first group of magnitudes includes M average bin magnitudes, where M is a number of bins having high level in-band interfering signals, M being less than N, and the second group of magnitudes comprises (N−M) average bin magnitudes.

19. The method of claim 12, wherein the first group of magnitudes includes M average bin magnitudes, where M is a subset of N bins having high level in-band interfering signals, and the second group of magnitudes comprises (N−(M+A)) average bin magnitudes, where A is a subset of N bins positioned adjacent the bin having high level in-band interfering signals.

20. The method of claim 10, wherein the pre-determined threshold is set to equal the interference statistic when the high level narrow-band interfering signal is known to be present.

21. In a mobile phone receiver having a low noise amplifier and a digital signal processor, a method for detecting and reducing distortion products resulting from a high level narrow-band interfering signal which produces in-band interference within a broad bandwidth receive signal, the method comprising:

receiving an analog receive signal;

converting the analog receive signal to a digital signal;

extracting a plurality of samples from the digital signal at a predetermined sampling interval;

in the digital signal processor, performing a spectral estimation for each of the plurality of samples, the spectral estimation comprising a plurality of frequency values, each frequency value having a magnitude within a range of magnitudes;

identifying within the range of magnitudes a first group of magnitudes representative of the high level narrow-band interfering signal and a second group of magnitudes representative of a base noise level for the broad bandwidth receive signal, the first group comprising a pre-determined number of magnitudes at a high end of the range of magnitudes;

computing a first averaged magnitude for the first group of magnitudes to determine an interference estimate of the in-band interference;

computing a second averaged magnitude for a second group to determine a noise estimate for the received signal;

calculating an interference statistic from the first averaged magnitude and the second averaged magnitude;

comparing the interference statistic to a pre-determined threshold and, if the interference statistic exceeds the pre-determined threshold, providing a bypass command to a switch for bypassing the low noise amplifier.

22. The method of claim 21, further comprising a variable gain amplifier and a gain control block responsive to the gain control signal, wherein the gain control block increases a gain of the variable gain amplifier when the digital signal processor generates a gain control signal in conjunction with the bypass command.

23. The method of claim 21, wherein the step of performing a spectral estimation comprises calculating a discrete Fourier transform.

24. The method of claim 23, wherein the plurality of frequency values comprises N bins of the discrete Fourier transform and the performing a spectral estimation further includes calculating an average bin magnitude for each bin from the plurality of samples to provide N average bin magnitudes, wherein the first group of magnitudes and the second group of magnitudes are taken from the N average bin magnitudes.

25. The method of claim 24, wherein the step of spectral estimation further includes filtering each of the plurality of samples through a bank of N filters with one filter corresponding to each bin.

26. The method of claim 25, wherein the step of filtering comprises using infinite impulse response filtering.

27. The method of claim 23, wherein the step of calculating a discrete Fourier transform includes performing a complex fast Fourier transform.

28. The method of claim 23, wherein the discrete Fourier transform has 64 points.

29. The method of claim 21, wherein the interference statistic comprises a ratio of the first averaged magnitude and the second averaged magnitude.

30. The method of claim 23, wherein the first group of magnitudes includes M average bin magnitudes, where M is a number of bins having high level in-band interfering signals, M being less than N, and the second group of magnitudes comprises (N−M) average bin magnitudes.

31. The method of claim 23, wherein the first group of magnitudes includes M average bin magnitudes, where M is a subset of N bins having high level in-band interfering signals, and the second group of magnitudes comprises (N−(M+A)) average bin magnitudes, where A is a subset of N bins positioned adjacent the bin having high level in-band interfering signals.

32. The method of claim 21, wherein the pre-determined threshold is set to equal the interference statistic when the high level narrow-band interfering signal is known to be present.

33. In a conventional CDMA mobile phone receiver front end having a low noise amplifier, and at least one digital-to-analog converter for converting an analog received signal within a CDMA bandwidth to a digital signal which is passed to a digital signal processor, a method for detecting in-band intermodulation distortion comprising:

performing a spectral estimation within the digital signal processor for calculating an estimate of discrete signal magnitudes with frequencies within the CDMA bandwidth to distinguish between signal magnitudes attributable to in-band intermodulation distortion and signal magnitudes attributable to a noise signal to provide an interference statistic; and comparing the interference statistic to a pre-determined interference threshold.

34. The method of claim 33, wherein the step of comparing comprises:

obtaining a plurality of samples from the digital signal at a pre-determined sampling interval;

performing a discrete Fourier transform on each of the plurality of samples to provide N bins within a frequency domain, each bin having a discrete signal magnitude;

averaging the discrete signal magnitude for each bin of the N bins across the plurality of samples to obtain N averaged signal magnitudes;

digitally filtering each bin of the N bins;

identifying M bins of the N bins having a group of M highest magnitudes within the N averaged signal magnitudes;

averaging the M highest magnitudes to provide an interference estimate;

averaging (N–M) averaged signal magnitudes to provide a noise estimate;

calculating an interference-to-noise ratio from the interference estimate and noise estimate; and comparing the interference-to-noise ratio to a pre-determined threshold indicative of in-band intermodulation distortion.

35. A method of detecting in-band intermodulation distortion in a CDMA receiver, the method comprising the steps of:

estimating a plurality of discrete signal magnitudes with frequencies within a CDMA bandwidth to distinguish between signal magnitudes attributable to in-band intermodulation distortion and signal magnitudes attributable to a noise signal to provide an interference statistic; and comparing the interference statistic to a pre-determined interference threshold.

36. A method of reducing in-band intermodulation distortion in a CDMA receiver receiving a CDMA bandwidth at a low noise amplifier of the receiver, the method comprising the steps of:

estimating a plurality of discrete signal magnitudes with frequencies within the CDMA bandwidth to distinguish between signal magnitudes attributable to in-band intermodulation distortion and signal magnitudes attributable to a noise signal to provide an interference statistic;

comparing the interference statistic to a pre-determined interference threshold; and reducing a signal gain if the interference statistic is greater than the pre-determined interference threshold.

37. The method of claim 36, wherein the step of reducing a signal gain comprises reducing a gain of the low noise amplifier.

38. The method of claim 36, wherein the step of reducing a signal gain comprises by-passing the low noise amplifier.

39. The method of claim 36, wherein the step of reducing a signal gain comprises attenuating the signal magnitudes.

40. A device for reducing in-band intermodulation distortion in an broadband receiver, the device comprising:

a low noise amplifier adapted to receive a broadband signal within a broadband spectrum;

a converter adapted to convert the receive signal into a digital signal;

a digital signal processor adapted to estimate a plurality of discrete signal magnitudes with frequencies within the broadband spectrum to distinguish between signal magnitudes attributable to in-band intermodulation distortion and signal magnitudes attributable to a noise signal to provide an interference statistic;

a switch adapted to bypass the low noise amplifier when the interference statistic is greater than a pre-determined interference threshold.

* * * * *